United States Patent [19]
Solomon et al.

[11] Patent Number: 5,676,472
[45] Date of Patent: Oct. 14, 1997

[54] ROTARY LABYRINTH SEAL

[75] Inventors: Todd Solomon, Los Gatos; Donald J. Thomas, San Jose, both of Calif.

[73] Assignee: Smart Machines, San Jose, Calif.

[21] Appl. No.: 500,124

[22] Filed: Jul. 10, 1995

[51] Int. Cl.⁶ .............................. F16C 33/78; F16C 33/82
[52] U.S. Cl. ..................... 384/607; 277/80; 384/133; 384/480
[58] Field of Search .......................... 384/607, 144, 384/480, 133; 277/80

[56] References Cited

U.S. PATENT DOCUMENTS

| | | | |
|---|---|---|---|
| 2,779,640 | 1/1957 | Jones | 384/480 |
| 4,348,067 | 9/1982 | Tooley | 384/144 |
| 4,527,915 | 7/1985 | Ikariishi et al. | 384/489 |
| 4,605,233 | 8/1986 | Sato | 277/80 |

OTHER PUBLICATIONS

Ferrofluidics Corporation, "Ferrofluidic Metric Vacuum Rotary Feedthroughs," (Information Bulletin). (1995).
Rigaku Corporation, "Rigaku/Magnetic Rotary Seal Unit—Rotary Feedthrough, RMS Seris," pp. 1–10. (1995).

*Primary Examiner*—Lenard A. Footland
*Attorney, Agent, or Firm*—Fish & Richardson, P.C.

[57] ABSTRACT

A rotary seal is located in a gap between an inner surface and an outer surface. A radial bearing allows the inner and outer surfaces to rotate relative to each other. A radial barrier includes a plurality of annular outward-pointing flanges attached to the inner surface interleaved with a plurality of annular inward-pointing flanges attached to the outer surface. The flanges may be angled and have an upturned lip located at an inner edge of each flange. The radial seal may include a magnet. A robotic arm has a first housing with a top surface and an aperture therein. A shaft extends up through the aperture, and there is a gap between the shaft and an inner edge of the aperture. A splash guard may extend over said gap, and an indentation in said top surface may at least partially surround the gap.

9 Claims, 5 Drawing Sheets

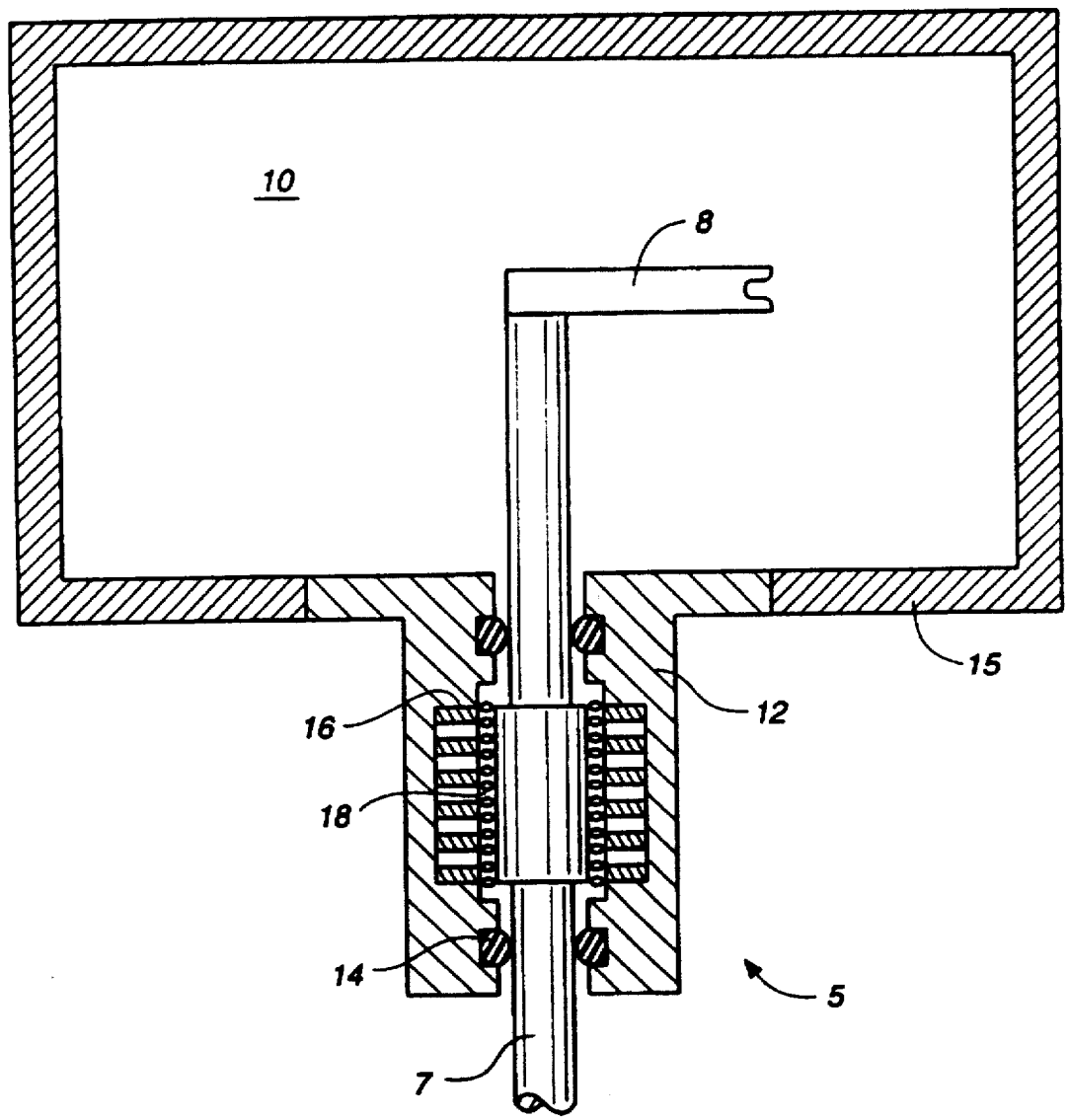
FIG._1
*(PRIOR ART)*

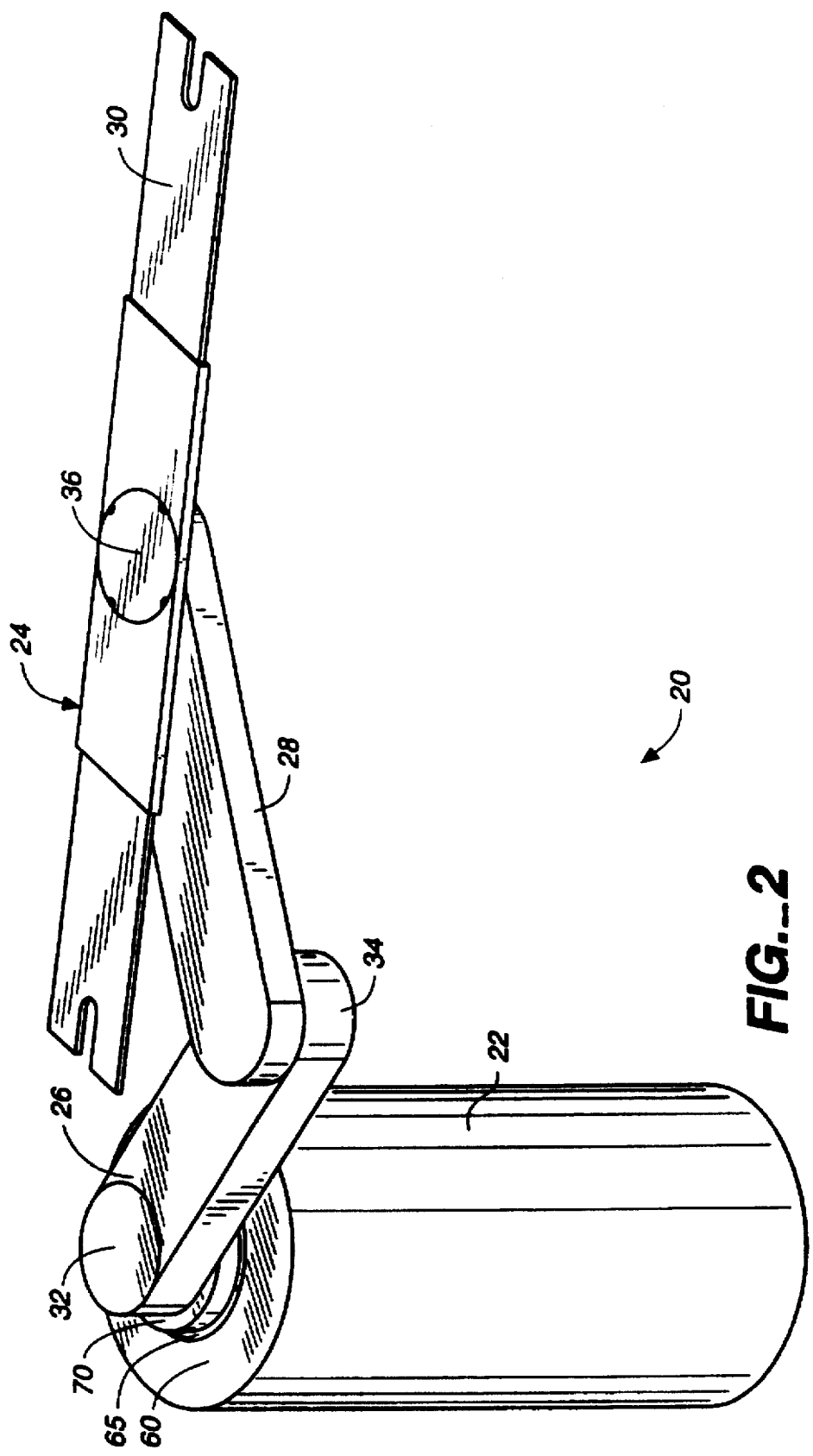
FIG._2

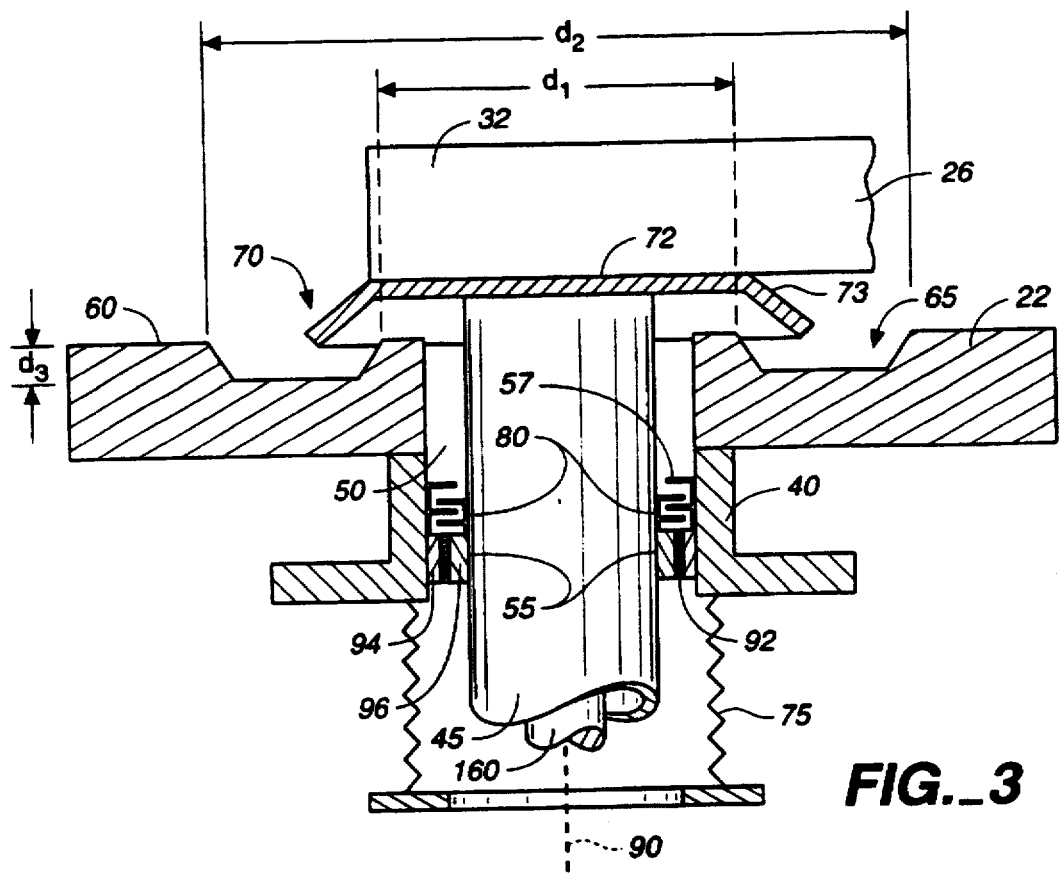
FIG._3
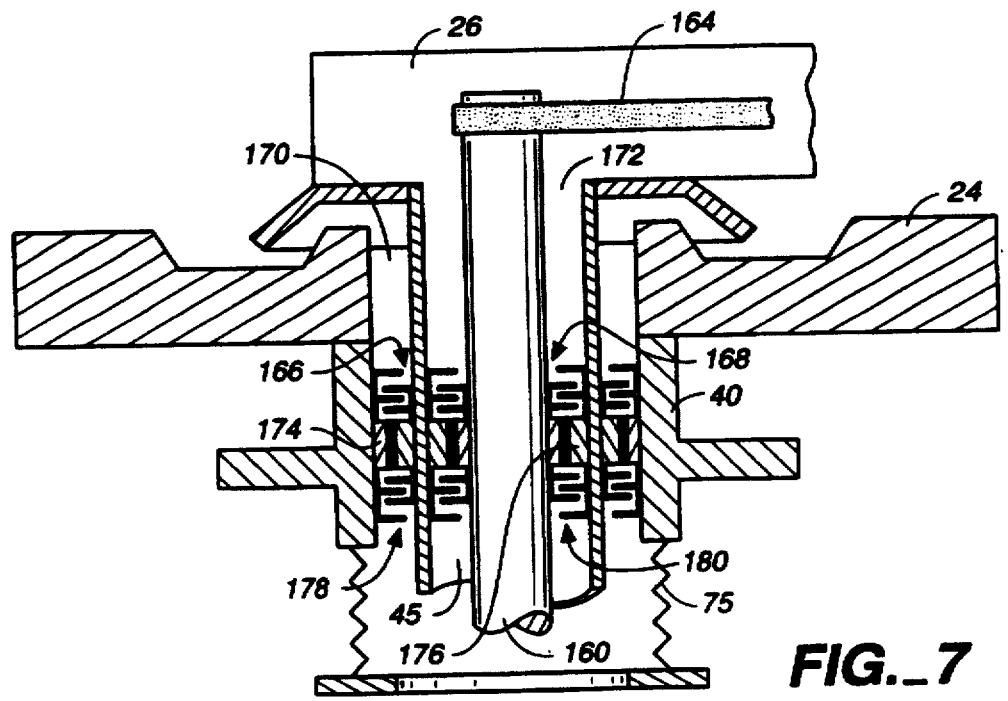
FIG._7

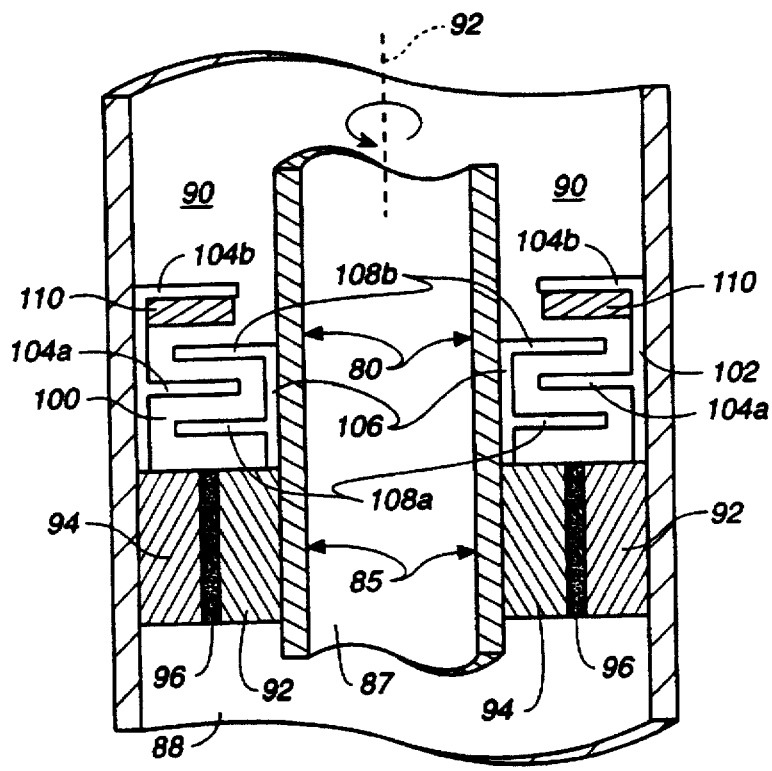
FIG._4
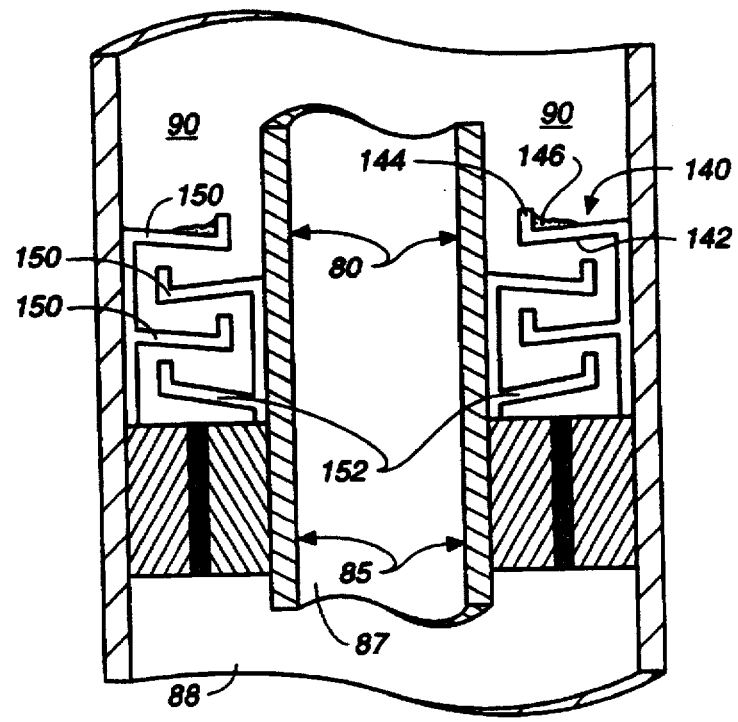
FIG._6

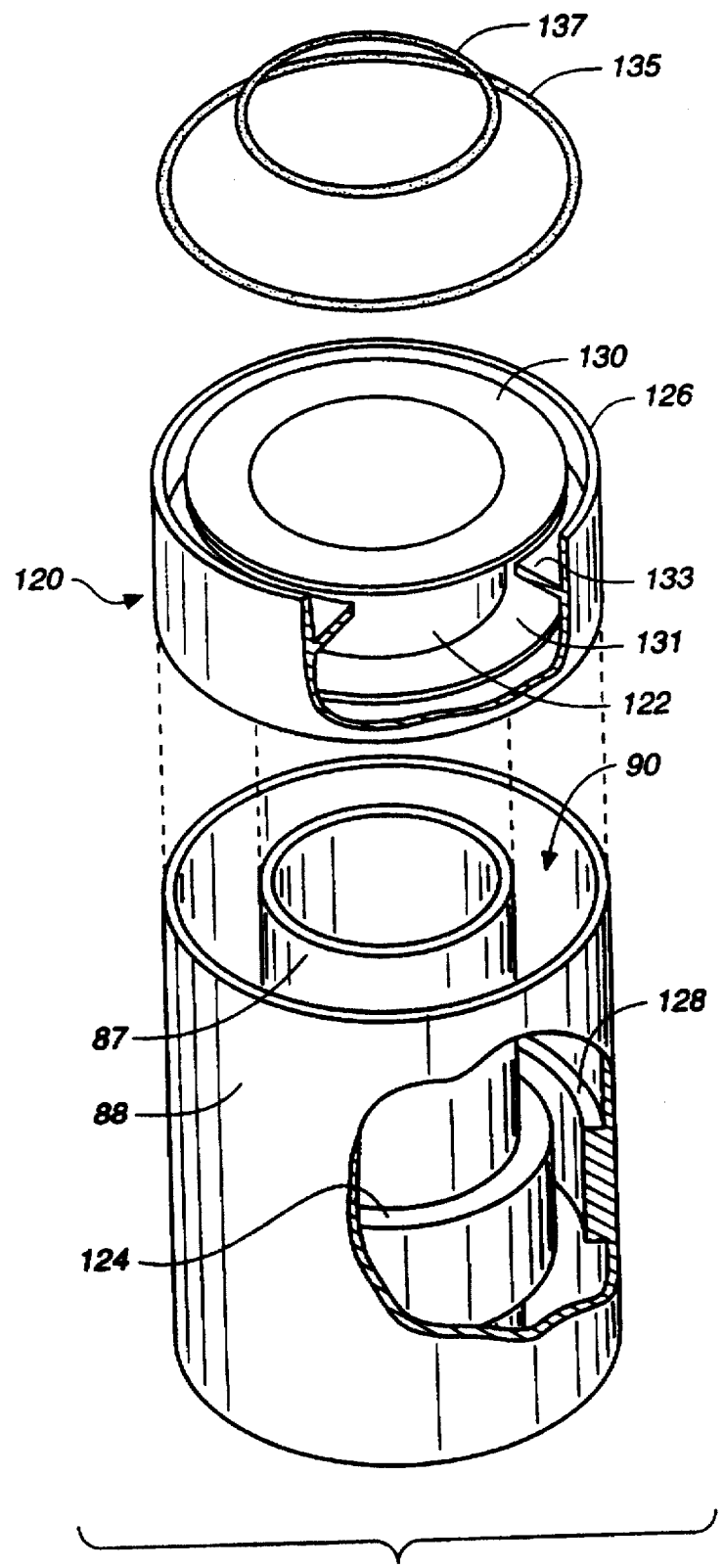
FIG._5

ROTARY LABYRINTH SEAL

CROSS REFERENCE TO RELATED APPLICATIONS

Reference is made to the concurrently filed applications, Ser. No. 08/500,428, filed Jul. 10, 1995, entitled DIRECT DRIVEN ROBOT, and Ser. No. 08/500,429, filed Jul. 10, 1995, entitled ROBOTIC JOINT USING METAL BANDS, assigned to the assignee of the present application, each of which is hereby incorporated by reference.

BACKGROUND OF THE INVENTION

The present invention relates generally to seals for rotating shafts, and more particularly to labyrinth seals and splash guards to protect a bearing and/or rotary seal between rotating shafts.

Material handling robots are used in automated manufacturing of integrated circuits, flat panel displays, and other precision-made products. Many of these products require near-sterile handling of extremely fragile and expensive materials, such as semiconductor wafers, during the manufacturing process. In semiconductor manufacturing, raw materials and in-process workpieces must be kept extremely clean; the circuit paths etched on the workpieces are so small (e.g., 0.18–10 microns) that minute particles can contaminate the paths and render the finished circuit inoperative. Therefore, sealed, ultra-clean robots are used to move the materials accurately, gently, and precisely, within a clean room, preventing contamination or damage to the materials which could occur through human contact or handling. However, such robots must not generate particles of metal, leak chemicals, or produce other materials which could contaminate a wafer or other substrate.

Further, robots must move precisely to specific points in space to carry out various manufacturing steps. Because wafers, flat panels, and other substrates are extremely fragile and expensive, all robot movements must be gentle and precise. "Backlash," or play in the mechanical components of the robot, must be minimized to ensure accurate movement and to prevent damage to an object on the robot.

In addition, some manufacturing processes are carried out in a vacuum, or require hazardous chemicals. Robots must be vacuum-compatible, and able to handle materials in vacuum and corrosive environments which are hostile to humans.

In many manufacturing applications, as shown in FIG. 1, a rotating shaft 7 extends into a chamber 10, such as an ultraclean room or a vacuum chamber. Shaft 7 is connected to some instrument 8, such as a robotic arm, a stirrer, a substrate support, or an electrode, in chamber 10. Because shaft 7 is driven by a motor at normal atmospheric pressure, the joint between shaft 7 and the chamber walls must be sealed by a rotary seal 5 to prevent atmosphere from entering chamber 10.

Seal unit 5 includes a housing 12 which surrounds shaft 7, and rotatable joint 14. Joint 14 might be a bearing, such as a ball bearing, or joint 14 could be seal, such as a rubber O-ring. A conventional manner of sealing the gap between rotatable shafts is a rubber O-ring. A more recent type of seal is the magnetic fluid, or "ferrofluid" seal. As shown in FIG. 1, in the magnetic fluid rotary seal, a ring of magnetic liquid 18 fills the gap between the moving shaft 7 and the stationary housing 12. Magnetic liquid 18 is held in place by powerful magnets 16, thereby sealing the gap while allowing rotation of shaft 7 virtually without abrasive friction. There is, however, a substantial viscous drag torque due to the viscosity of magnetic liquid 18.

There are two dangers associated with the use of rotary seal unit 5. First, particles might escape seal unit 5 and contaminate chamber 10. A total failure of the seal, under atmospheric pressure, can cause catastrophic blow-out of the magnetic liquid into chamber 10. This is disastrous in ultra-clean manufacturing processes such as semiconductor wafer fabrication. Second, particles from chamber 10 might enter and damage seal unit 5.

In view of the foregoing, it is an object of the invention to provide a rotary seal unit from which contaminates do not escape.

It is another object of the invention to provide a rotary seal which protects the internal joint from contaminants in the chamber.

SUMMARY OF THE INVENTION

The present invention is directed to a rotary seal. The seal is located in a gap between an inner surface and an outer surface. There is a radial bearing located in the gap for allowing the inner and outer surfaces to rotate relative to each other. A radial barrier is located in the gap. The radial barrier includes a plurality of annular outward-pointing flanges attached to the inner surface interleaved with a plurality of annular inward-pointing flanges attached to the outer surface.

The flanges in the radial seal may be angled and have an upturned lip located at an inner edge of each flange. The radial seal may include a magnet.

The invention is also directed to robotic arm with a first housing having a top surface and an aperture therein. A shaft extends up through the aperture, and there is a gap between the shaft and an inner edge of the aperture. A splash guard may extend over the gap, and an indentation in the top surface may at least partially surround the gap.

BRIEF DESCRIPTION OF THE DRAWING

FIG. 1 is a schematic cross-sectional view of a prior art rotary seal.

FIG. 2 is a schematic perspective view of a robot arm.

FIG. 3 is a schematic partial cross-section of the shoulder joint in a robot arm.

FIG. 4 is a schematic cross-section of a labyrinth seal with a magnet.

FIG. 5 is a schematic perspective view with partial cut-away of a labyrinth seal module.

FIG. 6 is a schematic cross-section of an angled labyrinth seal.

FIG. 7 is a view of FIG. 3 in which the outer shaft has been cut away.

DESCRIPTION OF THE PREFERRED EMBODIMENTS

As shown in FIG. 2, a robot 20 is constructed to mimic the lateral freedom of motion of a human arm. Robot 20 has a base 22 with an attached movable arm 24. Arm 24 includes an upper arm 26, a forearm 28, and a hand or end effector 30. Upper arm 26 is connected to base 24 by a rotatable shoulder 32, forearm 28 is connected to upper arm 26 by a rotatable elbow 34; and hand 30 is connected to forearm 28 by a rotatable wrist 36.

Base 22 contains motors to drive several rotatable shafts. One rotatable shaft connects directly to upper arm 26 and controls the rotation of shoulder 32. Another shaft connects to forearm 28 by a pulley (see FIG. 7) and controls the rotation of elbow 34.

For many applications, such as semiconductor fabrication, movable arm 24 of robot 20 must manipulate objects in an ultraclean environment or vacuum chamber. However, base 22 is usually operated at normal atmospheric pressure. Therefore, the joint between arm 24 and base 22 must be sealed to prevent atmosphere from entering the vacuum chamber.

As shown in FIG. 3, according to the present invention, base 22 includes a circular housing 40 surrounding a shaft 45. In gap 50 between the inner wall of housing 40 and the outer surface of shaft 45 there is a joint 55 which allows shaft 45 to rotate along its primary or central axis relative to the housing 40. Joint 55 may also act as a seal. For example, joint 55 may be a magnetic fluid rotary seal which includes multiple magnetic liquid rings. Since each additional ring increases the pressure differential the seal can sustain without rupturing, a sufficient number of rings will allow base 22 to be maintained at atmospheric pressure while arm 24 operates in a vacuum.

Above joint 55, in gap 50 between housing 40 and shaft 45, there is a labyrinth seal 57. Labyrinth seal 57 will be explained in detail with reference to FIG. 4. Continuing with FIG. 3, beneath housing 40 is a bellows 75, which is formed like a cylindrical metal accordion.

Since movable arm 24 operates in an ultraclean chamber, any leakage of sealing material or bearing material from joint 55 into the chamber must be prevented. For example, droplets of magnetic liquid can escape from a magnetic fluid seal and contaminate the vacuum chamber. As another example, particles may be ground off a rotating bearing and contaminate the ultraclean environment.

It is also possible for joint 55 to be contaminated by material from the vacuum chamber side. For example, sputtered materials may lodge in the seal, or cleaning solution may be spilled into gap 50. When such a contaminant enters joint 55, it may, for example, dilute the magnetic fluid and destroy the joint.

Also, if cleaning solution is splashed on bellows 75, then metal particles carried by the cleaning solution will lodge on the pleats of bellows 75. When bellows 75 compresses and the pleats fold together, the lodged particles will grind and damage the bellows.

The top surface 60 of base 22 has a depression to catch liquid and prevent it from entering gap 50. Preferably, the depression is a circular moat 65 located around shoulder 32. A splash guard 70 is mounted directly to the bottom of shoulder 32, surrounding shaft 45. Splash guard 70 is formed as a circular disk 72 with a downwardly angled edge 73. Circular disk 72 projects out beyond shoulder 26 and downturned edge 72 drops slightly below top surface 60 into moat 65. Moat 65 is deep and wide enough to hold about four cubic inches of liquid. Assuming that top surface 60 of base 22 has a diameter of sixteen inches, then the moat has an inner diameter of 6.5 inches, an outer diameter of 8 inches, and a depth of 0.35 inches. Splash guard 70 may be firmly attached to either the bottom of arm 26, or directly to shaft 45, but in either case it will rotate with shaft 45. Moat 65 is cut out to be clear in any possible position of arm 36 so that splash guard 70 does not affect the rotation of shaft 45.

If liquid is splashed directly on arm 26, then the liquid will run down the sides of shoulder 32, onto splash guard 70, and into moat 65. The liquid will collect in moat 65 rather than enter gap 50. For example, if someone cleaning robot 20 pours alcohol directly on shoulder 32, the alcohol will pool in moat 65 and not reach seal 55. Pooled liquid in moat 65 may later be removed by an eyedropper, or it may soak into an absorbent material, or it may be left to evaporate.

As shown in FIG. 4, a labyrinth seal 80 is located adjacent a joint 85 in the gap 90 between an inner shaft 87 and an outer shaft 88. Outer shaft 88 may be part of an immobile housing (see also FIG. 3) or the outer shaft may be another rotating shaft which surrounds the inner shaft (see also FIG. 6). In either case, joint 85 allows inner shaft 87 to rotate with respect to outer shaft 88 about axis 92. The joint 85 may be a bearing, such as a pair of ball bearings, or a seal, such as an O-ring or a magnetic fluid seal, or a combination of bearings and seals. Joint 85 will include inner and outer support structures 92 and 94, and seal or bearing 96.

Labyrinth seal 80 generally takes the form of a radial conduit 100 having a tortuous intrawound path from the exterior of seal 80 to joint 85. Labyrinth seal 80 includes an outer cylindrical surface 102 having inward pointing radial flanges 104a, 104b, and an inner cylindrical surface 106 having outward radial flanges 108a, 108b. The inward pointing flanges 104a, 104b are interleaved with the outward pointing flanges 108a, 108b to form conduit 100. Although FIG. 4 shows exactly four flanges, the invention can apply to two or more flanges.

The flanges of labyrinth seal 80 act as a barrier to particles that escape joint 85. For example, if joint 85 is a magnetic fluid seal, then magnetic fluid that leaks from joint 85 may be captured in conduit 100. The greater the number of flanges, the more tortuous the conduit 100, and the more likely that particles will be trapped. In addition, in the event of a catastrophic failure of joint 85, labyrinth seal 80 can prevent contaminants from entering chamber 10. This is because the intrawound path 100 provides a large volume in which contaminants can accumulate.

In general, the ratio between the width of gap 90 and the distance between adjacent flanges should be about 3:1. The flanges should project into gap 90 sufficiently to overlap, and there should not be any straight path from joint 85 to the open area of gap 90. Preferably, the flanges project about ¾ of the distance to the opposite wall.

Labyrinth seal 80 may be formed as an integral part of shafts 87 and 88, or it may be manufactured as a separate module which is dropped into gap 90. If labyrinth seal 80 is an integral part of shafts 87 and 88, then outward-pointing flanges 108a, 108b could be attached directly to inner shaft 87 which would serve as the inner surface 104. Similarly, inward-pointing flanges 106a, 106b could be attached directly to outer shaft 88.

In the preferred embodiment, as shown in FIG. 5, labyrinth seal 80 is a separate module 120. Module 120 is dropped into gap 90. The inner wall 122 of module 120 rests on a step 124 in inner shaft 87 and outer wall 126 of module 120 rests on a step 128 in outer shaft 88. Outward directed flanges 130 and 131 are attached to inner wall 122, and inward directed flange 133 is attached to outer wall 126. After module 120 is inserted into gap 90, circular clips 135 and 137 are used to clip inner wall 122 to shaft 87 and outer wall 126 to shaft 88.

As shown in FIG. 4, labyrinth seal 80 may include one or more magnets 110. In the preferred embodiment, magnet 110, is a radial washer attached to the uppermost flange (e.g. flange 104b). If joint 80 produces magnetic particles, then magnet 110 will help prevent those particles from contaminating the ultraclean environment. For example, if joint 85 is a magnetic fluid seal, then magnetic liquid which escapes from joint 85 will be attracted and held by magnet 110, and will be less likely to escape seal 80.

Labyrinth seal 80 may also be integrated with joint 85 as a single module. In such an embodiment, the inner and outer walls 122 and 126 would be attached to the inner and outer support structures 92 and 94, respectively.

As shown in FIG. 6, the flanges in labyrinth seal 80 may be angled away from the horizontal. Each flange 140 includes an angled base 142 and an upturned lip 144. The bases of upper flanges 150 may be angled downward, whereas the base of the lowest flange 152 may be angled upward. The angled base and upturned lip structure of flanges 140 help prevent joint 85 from being contaminated by materials from chamber 10. Specifically, if a liquid is spilled or poured into gap 90, for example, when equipment is washed down with solvents, then the liquid will trapped by lip 144 to form a pool 146. In case of an overflow from upper flanges 150, the upward angle of the base of lowest flange 152 provides additional storage capacity for the liquid. Eventually, pool 146 will evaporate.

As shown in FIG. 7, base 22 of robot 20 may have a housing 40, an outer shaft 160 that connects a shoulder motor to upper arm 26, and an inner shaft 162 that connects an elbow motor to a shoulder pulley 164. Shoulder pulley 164 runs inside arm 26 and connects to forearm 28. There is a gap 170 between housing 40 and outer shaft 160, and a gap 172 between outer shaft 160 and inner shaft 162. Labyrinth seals 166 and 168 are positioned concentrically in gaps 170 and 172, respectively, above joints 174 and 176. More labyrinth seals 178 and 180 may be placed below joints 174 and 176 to provide additional protection for bellows 75.

Other implementations of the invention are contemplated and are within the scope of the invention.

What is claimed is:

1. A radial seal comprising:

an inner surface;

an outer surface, the inner and outer surfaces separated by a gap;

a radial bearing located in the gap for allowing the inner and outer surfaces to rotate relative to each other; and a radial barrier located in said gap, the barrier including a plurality of angled annular outward-pointing flanges attached to the inner surface interleaved with a plurality of annular inward-pointing flanges attached to said outer surface, each of said flanges having an upturned lip at an inner edge thereof.

2. The radial seal of claim 1 wherein the flange located nearest the radial bearing is angled downwardly.

3. The radial seal of claim 2 wherein the flanges other than the flange located nearest the radial bearing are angled upwardly.

4. The radial seal of claim 1 further comprising a magnet located in the gap.

5. A radial seal comprising:

an inner surface;

an outer surface, the inner and outer surfaces separated by a gap;

a radial bearing located in the gap for allowing the inner and outer surfaces to rotate relative to each other;

a magnet located in the gap; and a radial barrier located in the gap, the barrier including a plurality of annular outward-pointing flanges attached to the inner surface interleaved with a plurality of annular inward-pointing flanges attached to the outer surface.

6. The radial seal of claim 5 wherein the magnet is attached to a flange.

7. A robotic arm comprising:

a housing having a top surface with an aperture therein and an indentation at least partially surrounding the aperture;

a shaft extending up through the aperture, there being a gap between the shaft and the housing;

a radial bearing located in the gap for allowing the shaft to rotate relative to the housing; and a radial barrier located in the gap, the barrier including a plurality of annular outward-pointing flanges attached to the shaft interleaved with a plurality of annular inward-pointing flanges attached to the housing.

8. The robotic arm of claim 7 further comprising a splash guard connected to the shaft and extending over the aperture.

9. A robotic arm comprising:

a housing having a top surface with an aperture therein a shaft extending up through the aperture, there being a gap between the shaft and the housing;

a splash guard connected to the shaft and extending over the aperture;

a radial bearing located in the gap for allowing the shaft to rotate relative to the housing;

a radial barrier located in the gap, the barrier including a plurality of annular outward-pointing flanges attached to the shaft interleaved with a plurality of annular inward-pointing flanges attached to the housing.

\* \* \* \* \*